United States Patent
Ishikawa

[19]

[11] Patent Number: 5,901,673
[45] Date of Patent: May 11, 1999

[54] TWO-CYCLE INTERNAL COMBUSTION ENGINE

[75] Inventor: Takeshi Ishikawa, Tokyo, Japan

[73] Assignee: Kioritz Corporation, Tokyo, Japan

[21] Appl. No.: 08/950,650

[22] Filed: Oct. 15, 1997

[30] Foreign Application Priority Data

Oct. 16, 1996 [JP] Japan .................................. 8-273474

[51] Int. Cl.⁶ .................................................... F02B 33/04
[52] U.S. Cl. .................................... 123/73 B; 123/73 PP
[58] Field of Search ............................. 123/73 B, 73 PP

[56] References Cited

U.S. PATENT DOCUMENTS

| | | | |
|---|---|---|---|
| 3,190,271 | 6/1965 | Gudmundsen | 123/73 C |
| 3,730,149 | 5/1973 | Brown | 123/73 R |
| 4,625,688 | 12/1986 | Takayasu | 123/73 C |
| 4,768,474 | 9/1988 | Fujimoto et al. | 123/73 B |
| 4,779,581 | 10/1988 | Maier | 123/73 B |
| 4,876,999 | 10/1989 | Schierling et al. | 123/252 |
| 5,159,903 | 11/1992 | Takahashi | 123/73 B |
| 5,279,267 | 1/1994 | Takahashi et al. | 123/73 B |
| 5,645,018 | 7/1997 | Ishibashi et al. | 123/73 B |
| 5,740,767 | 4/1998 | Kaku et al. | 123/73 B |

*Primary Examiner*—Noah P. Kamen
*Attorney, Agent, or Firm*—Baker & Botts, L.L.P.

[57] ABSTRACT

A two-cycle internal combustion engine of the fuel injection type, which comprises a cylinder block provided with a combustion chamber and a scavenging passage; a scavenging passage cover constituting a portion of a wall of the scavenging passage; and a fuel injection nozzle mounted on and penetrating through the scavenging passage cover, a distal end portion of the fuel injection nozzle being directed into the combustion chamber so as to inject the fuel directly into the combustion chamber.

4 Claims, 1 Drawing Sheet

TWO-CYCLE INTERNAL COMBUSTION ENGINE

BACKGROUND OF THE INVENTION

1. Field of the Invention

This invention relates to a two-cycle internal combustion engine of the fuel injection type, and in particular to a two-cycle internal combustion engine of the fuel injection type which is relatively small in size and suited for use in a portable working machine such as a chain saw or a bush cutter.

2. The Prior Art

Because of the increasing concern in recent years of environmental problems, a reduction not only of the toxic substances in the exhaust gas but also of the engine noise is strongly demanded even in a small two-cycle internal combustion engine. In particular, there are pollution problems inherent to a two-cycle internal combustion engine, i.e. a problem of how to reduce the quantity of HC in the exhaust gas which is brought about due to a phenomenon of blow-by of unburnt air-fuel mixture from the combustion chamber, and a problem of how to prevent the discharge of the unburnt air-fuel mixture which is brought about due to a phenomenon of spitting of fuel toward the air-cleaner. These problems are also desired to be solved.

On the other hand, a lean burn engine or a direct injection engine, wherein fuel is directly injected into a combustion chamber, has been recently proposed as a four-cycle internal combustion engine. In these types of engine, the reduction of toxic substances in the exhaust gas by means of a lean-burning technique is taken into consideration Therefore, it is now studied how to apply this technique to a two-cycle internal combustion engine.

The conventional two-cycle internal combustion engine of relatively small size (total displacement. 60 cc or less) which is now employed in a portable working machine such as a chain saw or a bush cutter, is generally composed of a cylinder portion having a cylindrical inner wall, so as to allow a piston to be slidable fitted therein, a head portion provided with a combustion chamber of the so-called squish dome type, and a plurality of air-cooling fins formed on the outer peripheries of these cylinder and head portion. The cylinder portion is provided with a suction port and an exhaust port which are disposed respectively at the upper and lower portion of the cylinder portion so as to face to each other. A pair of scavenging ports are also formed in the inner wall of the cylinder portion so as to face to each other, the openings of these scavenging ports being located to intersect at a right angle with the suction port and exhaust port. There is also known an internal combustion engine which is aimed at facilitating the monoblock casting of the cylinder portion and the head portion by means of a high pressure die casting, wherein a pair of openings for casting are formed along each scavenging passage communicating with the scavenging port so as to expose each scavenging passage. In this case, a pair of scavenging passage covers, each having a smoothly curved inner surface in conformity with the scavenging passage and prepared separately from the cylinder portion, is attached to the openings-for-casting, respectively, so as to close the openings-for-casting, thereby forming smoothly curved scavenging passages.

On the other hand, a two-cycle internal combustion engine of the direct fuel injection type is also proposed, wherein a fuel injection nozzle is disposed at a cylinder head portion of the combustion chamber so as to permit the injection of fuel to be effected directly to the combustion chamber. (See, for example, U.S. Pat. No. 4,813,391.) In this two cycle internal combustion engine, a fuel pump is actuated taking advantage of the fluctuation in pressure within a crank case. Through such actuation of the fuel pump, fuel is fed to the fuel injection nozzle and then directly injected into the combustion chamber, thereby allowing the fuel to be mixed with suction air that has been sucked via the scavenging port into the combustion chamber, the resultant air-fuel mixture being ignited and burnt.

There is also known another example of a two-cycle internal combustion engine of the direct fuel injection type, wherein a fuel injection nozzle is disposed midway of an air passage (scavenging passage) communicating with the combustion chamber. Fuel from the injection nozzle is injected toward a heat conductive wall constituting a cylinder wall and allowed to impinge thereon so as to be gasified and mixed with air passing through the air passage, the resultant air-fuel mixture being fed to combustion chamber (See U.S. Pat. No. 4,876,999).

However, in the case of the former engine of direct fuel injection type (See U.S. Pat. No. 4,813,391) wherein the fuel injection nozzle is mounted on the cylinder body and fuel is directly injected from the fuel injection nozzle into the combustion chamber, a hole for mounting the injection nozzle and communicating with the interior of the cylinder body is required to be formed in the cylinder body. Namely, a troublesome working of the cylinder body is required to be performed. At the same time, since the injection nozzle is mounted on the combustion chamber portion of the cylinder body, the heat from the combustion chamber is conducted through the cylinder body to the injection nozzle, thereby heating the injection nozzle with the result that the fuel in the injection nozzle may be excessively heated before being injected.

On the other hand, in the case of the latter internal combustion engine (U.S. Pat. No. 4,876,999), since the fuel from the injection nozzle is injected toward the wall of the air passage communicating with the combustion chamber so as to be impinged thereon and mixed with air, a phenomenon of spitting of fuel toward the air-cleaner, which is disposed for feeding air to the engine, may tend to occur. In such case, unburnt air-fuel mixture may be released through the air-cleaner to the ambient atmosphere, thus producing an environmental problem. Furthermore, since the fuel from the injection nozzle is injected toward a heat conductive wall constituting the cylinder wall, it is difficult to control the air/fuel ratio of the engine, such as the aforementioned lean burn combustion.

SUMMARY OF THE INVENTION

The present invention has been made under the circumstances mentioned above. It is therefore an object of the present invention to provide a two-cycle internal combustion engine of the fuel injection type in which the mounting of the fuel injection nozzle on the cylinder body is facilitated and in which the injection nozzle is maintained at a relatively low temperature and fuel is injected directly into the combustion chamber.

Another object of the present invention is to provide a two-cycle internal combustion engine of the fuel injection type, which is capable both of reducing the quantity of toxic substances in the exhaust gas and of minimizing the phenomenon of spitting of fuel.

According to the present invention, there is provided a two-cycle internal combustion engine of the fuel injection type, which comprises a cylinder block provided with a combustion chamber and a scavenging passage; a scavenging passage cover constituting a portion of wall of the scavenging passage; and a fuel injection nozzle; wherein the fuel injection nozzle is mounted on and penetrating through the scavenging passage cover, a distal end portion of the fuel injection nozzle being directed to the combustion chamber so as to allow the fuel to be directly injected to the combustion chamber.

A two-cycle internal combustion engine of the fuel injection type constructed in accordance with the invention can be operated as follows. When the piston is moved upward to start the discharge of a combustion exhaust gas from the combustion chamber, the scavenging port is opened to allow the pre-compressed intake air in the crank chamber to flow via the scavenging passage into the combustion chamber so as to discharge any residual combustion exhaust gas from the cylinder chamber, thereby scavenging the combustion chamber.

While the combustion chamber is being scavenged, the piston starts to move upward to ultimately close the scavenging port. At a suitable timing before the scavenging port is completely closed, fuel is directly injected from the fuel injection nozzle into the combustion chamber and mixed with the sucked air. After this injection of fuel, the piston is further moved upward to enter into a compression stroke, and when the piston is further advanced to reach near the top dead center, the air-fuel mixture is ignited by a spark plug to cause the air-fuel mixture to be explosively burnt.

In the expansion stoke following the explosion of the air-fuel mixture, the piston is moved downward to pre-compress the air that has been sucked into the crank chamber, in preparation of repeating a sequence of the strokes as mentioned above.

Since the two-cycle internal combustion engine according to the present invention is designed such that a fuel injection nozzle is disposed at a scavenging passage portion so as to inject a fuel directly to a combustion chamber, the phenomenon of spitting of fuel toward an air-cleaner is minimized.

Since the scavenging of combustion exhaust gas in the combustion chamber is performed by making use of only the sucked air in the initial stage of scavenging stroke, there is a little possibility that unburnt air-fuel mixture is discharged together with the combustion exhaust gas. As a result, it is possible to effectively purge the exhaust gas.

Furthermore, since the fuel injection nozzle is mounted on the scavenging passage cover, the heat from the cylinder block is conducted to the fuel injection nozzle via the scavenging passage cover which is always exposed to the scavenging air flow of relatively low temperature. Thus, it is possible to maintain the fuel injection nozzle at a relatively low temperature.

DETAILED DESCRIPTION OF THE INVENTION

Figure 1:
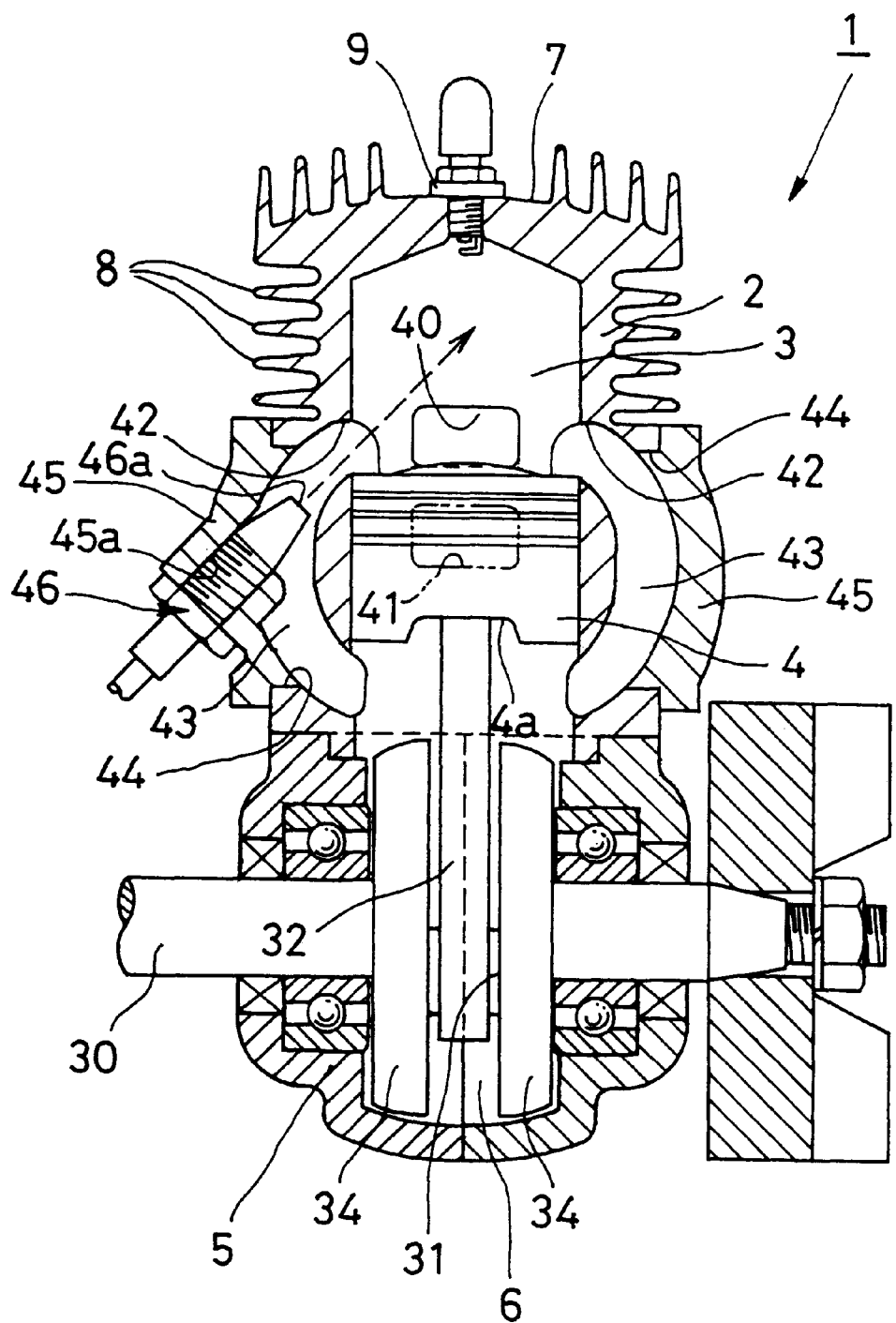
FIG. 1 is a longitudinal sectional view illustrating one embodiment of a two-cycle internal combustion engine according to the present invention.

The invention will be further explained with reference to the drawing depicting one embodiment of a two-cycle internal combustion engine according to this invention.

In the embodiment illustrated in FIG. 1, a fuel-injection type, two-cycle internal combustion engine 1 (hereinafter referred to simply as an internal combustion engine) constructed in accordance with the invention comprises a so-called Schnuerle type crank chamber pre-compression two-cycle internal combustion engine. It includes a cylinder block 2 having a combustion chamber 3 in which a piston 4 is adapted to be slidingly moved up and down, a split type crankcase 5 attached to the lower end portion of the cylinder block 2 and provided therein with a crank chamber 6, a cylinder head 7 which is formed integrally with the upper portion of the cylinder block 2, a plurality of cooling fins 8 for air-cooling formed on the outer periphery of the cylinder block 2 and cylinder head 7, and a spark plug 9 connected to an electronic control type ignition device (not shown).

The crank chamber 6 is cylindrical in shape, short in height and hermetically closed. A crank shaft 30 is axially held at a central portion of each of the right and left sides of the crank chamber 6. The piston 4 is connected via a connecting rod 32 to a crank pin 31 of the crank shaft 30. A pair of sector-shaped crank webs 34 are fixed at the right and left ends of the crank pin 31 so that the connecting rod 32 is interposed between the pair of sector-shaped crank webs 34. Consequently, the crank webs 34 are designed to be rotated integral with the crank shaft 30.

The cylinder block 2 is provided with an exhaust port 40 which opens at a portion of the inner wall of the combustion chamber 3 that is directed to intersect at a right angle with the axis of the crank shaft 30. The cylinder block 2 is also provided with a suction port 41 which opens at a portion of the inner wall of the combustion chamber 3 that approximately faces the exhaust port 40 (a portion which is dislocated by an angle of 180) but is located at somewhat lower level than where the exhaust port 40 is located. Furthermore, a pair of scavenging ports 42 are formed in the cylinder block 2 to face each other at portions of inner wall of the cylinder block 2 that are located at an intermediate portion between the exhaust port 40 and the suction port 41, i.e. each port 42 is dislocated by an angle of 90 from the exhaust port 40 and the suction port 41 (right and left sides in FIG. 1). These scavenging ports 42 are formed respectively on the top of each of so-called wall type scavenging passages 43, each of which extends from the scavenging ports 42 toward the lower portion of the cylinder block 2 so as to communicate with the crank chamber 6.

In order to facilitate the monoblock casting of the cylinder block 2 and cylinder head 7 by means of a high pressure die casting, a pair of openings-for-casting 44 are formed respectively along the scavenging passages 43, thereby allowing the outer side of each scavenging passage 43 to communicate with the outer atmosphere. Accordingly, a pair of scavenging passage covers 45, each having a smoothly curved inner surface in conformity with the scavenging passage 43 and prepared separately from the cylinder block 2, is attached to the openings-for-casting 44, respectively When the scavenging passage covers 45 are fixed to the openings-for-casting 44 respectively, by making use of an adhesive for instance, the openings-for-casting 44 are closed, thereby completing smoothly curved passages so as to allow scavenging air to pass therethrough, thus exhibiting an efficient scavenging.

One (the one on the left side in FIG. 1) of the scavenging passage covers 45 is provided with an internally threaded through-hole 45a, in which a fuel injection nozzle (for example, a bubble jet type) 46 having an external thread on its outer peripheral wall is inserted or screwed. The distal end 46a of the fuel injection nozzle 46 is directed toward the top of the combustion chamber 3, so that when the fuel is injected, it is fed to a region inside the combustion chamber 3 that is optimum for the combustion of the fuel.

Next, the operation of the aforementioned internal combustion engine 1 according to this embodiment will be explained as follows.

The internal combustion engine 1 according to this embodiment is of a so-called piston valve system, wherein neither a suction valve nor an exhaust valve is provided, and the suction port 41 and the exhaust port 40 are alternatively allowed to communicate respectively with the crank chamber 6 and with the combustion chamber 3 by the reciprocating movement (up and down movement) of the piston 4, thereby performing the suction and exhaust of the engine in the same manner as the aforementioned suction valve and exhaust valve.

In the operating condition of the internal combustion engine 1 where the piston 4 moves up and down, when the piston 4 moves down to come close to the bottom dead center, the exhaust port 40 is opened at first, thereby allowing the combustion exhaust gas to be discharged from the interior of the combustion chamber 3 to the outside of the internal combustion engine 1. Then, the scavenging ports 42 are opened thereby allowing the air sucked and pre-compressed in the crank chamber 6 to flow via the scavenging passages 43 into the combustion chamber 3, thereby purging any residual combustion exhaust gas out of the combustion chamber 3 through the exhaust port 40, thus scavenging the combustion chamber 3. A little amount of the inhaled air is also discharged through the exhaust port 40.

During this scavenging operation, the piston 4 starts to move upward to close the scavenging ports 42 again. However, at a suitable timing immediately before the scavenging ports 42 are closed, the fuel such as lubricat mixed gasoline is injected directly into the combustion chamber 3 from the fuel injection nozzle 46 and mixed with the air sucked in the combustion chamber 3. After the injection of fuel, the piston 4 is further moved upward to close the scavenging ports 42 at first and then to enter into the compression stroke while closing the exhaust port 40. When the piston 4 is further advanced to reach near the top dead center, the spark plug 9 is ignited to spark and cause the air-fuel mixture to be explosively burnt.

As explained above, when the piston 4 is in the compression stroke, the pressure in the crank chamber 6 is gradually decreased with the ascending movement of the piston 4, SO that when the skirt portion 4a of the piston 4 is moved up passing through the suction port 41, thereby allowing the suction port 41 to be communicated with the crank chamber 6, the ambient air is simultaneously sucked into the crank chamber 6 through an air cleaner (not shown).

In the expansion stoke following the explosion of the air-fuel mixture, when the piston 4 is moved downward to close the suction port 41, the air that has been sucked in the crank chamber 6 is pre-compressed, then the scavenging ports 42 are opened to allow the crank chamber 6 to communicate with the combustion chamber 3. As a result, the air that has been sucked and pre-compressed in the crank chamber 6 is forced to enter, via the scavenging passages 43 into the combustion chamber 3 from the scavenging ports 42, thus making it ready to repeat the sequence of the strokes as mentioned above.

Since the two-cycle internal combustion engine 1 according to this embodiment is designed such that the fuel injection nozzle 46 is disposed at the scavenging passage portion 43 so as to inject a fuel directly to the combustion chamber 3, the phenomenon of spitting of fuel toward the air-cleaner through the crank chamber 6 is minimized.

Since the scavenging of combustion exhaust gas in the combustion chamber 3 is performed by making use of only the sucked air in the initial stage of the scavenging stroke, there is a little possibility that unburnt air-fuel mixture is discharged together with the combustion exhaust gas. As a result, it is possible to effectively purge the exhaust gas.

Further, since the fuel can be atomized by the fuel injection nozzle 46 before being fed to the combustion chamber 3 and since, at the same time, the atomized fuel is mixed with the sucked air for the first time in the combustion chamber 3, the control of air/fuel ratio of engine such as the lean burn combustion, can be easily and precisely performed.

Furthermore, since the fuel injection nozzle 46 is mounted on the scavenging passage cover 45 of the scavenging passage 43, heat from the cylinder block 2 is conducted to the fuel injection nozzle 46 via the scavenging passage cover 45 which is always exposed to the scavenging air flow of relatively low temperature. Thus, it is possible to maintain the fuel injection nozzle 46 at a relatively low temperature as compared with the conventional case where a fuel injection nozzle is directly mounted on a cylinder block. Additionally, since the fuel injection nozzle 46 is protruded into the scavenging passage 43, the tip end portion 46a of the fuel injection nozzle 46 is always cooled by the sucked air passing toward the combustion chamber 3 via the scavenging passage 43, thereby suppressing an excessive increase in temperature of the fuel to be injected.

Further, the scavenging passage cover 45 for mounting the fuel injection nozzle 46 thereon is of the same structure as employed conventionally for achieving the monoblock casting of the cylinder block 2 (provided with the wall type scavenging passages 43) and the cylinder head portion 7 by making use of the high pressure die casting of an aluminum alloy, so that the fuel injection nozzle 46 can be mounted on the scavenging passage cover 45 by simply perforating a threaded hole through the body of the scavenging passage cover 45. Consequently, no special structure, casting method or mechanical working is required for the mounting of the fuel injection nozzle 46.

In the foregoing explanation, the present invention has been explained with reference to one embodiment. However, the present invention should not be construed to be limited to this embodiment, but may be variously modified within the spirit of the invention set out in the claims.

For example, the aforementioned fuel injection nozzle 46 may be disposed also on the right side scavenging passage 43, thereby making it possible, if required, to inject a fuel simultaneously or alternatively from the right and left fuel injection nozzles 46. The scavenging passage cover 45 may be formed from a material of high heat-insulating property or of excellent heat-radiating property.

Additionally, the suction port 41 need not be formed at the combustion chamber 3, i.e. instead of the suction port 41, a lead valve may be installed at the bottom of the crank chamber 6 so as to perform the suction through this lead valve. Further, the fuel injection nozzles 46 may not be attached to the aforementioned scavenging passage 43, but may be attached to a scavenging passage cover constituting a sub-scavenging passage which is provided between a pair of so-called main scavenging passages disposed on the right and left sides of the combustion chamber.

As is apparent from the above explanation, according to the present invention, a two-cycle internal combustion engine of direct injection type which enables fuel to be injected directly into the combustion chamber is realized through the mounting of a fuel injection nozzle on the existing scavenging passage cover. Moreover, it is now possible, according to the present invention, to provide a two-cycle internal combustion engine which is capable of maintaining the fuel injection nozzle at a relatively low temperature in spite of the fact that the engine is of direct injection type.

It is also possible according to the present invention to provide a two-cycle internal combustion engine which is capable of minimizing the phenomenon of spitting of fuel and the phenomenon of blow-by of unburnt air-fuel mixture and, at the same time, capable of easily controlling the air/fuel ratio.

I claim:

1. A Schnuerie type crank chamber pre-compression two-cycle internal combustion engine of the fuel injection type, comprising:

a crankcase having a crank chamber;

a cylinder block provided with a combustion chamber, a suction port for communicating ambient air into said crank chamber, an exhaust port and a scavenging passage having a scavenging port which opens to said combustion chamber, said scavenging passage communicating said crank chamber with said combustion chamber;

a piston slidably disposed in said cylinder block delimiting said combustion chamber and, in engine operation, effecting opening and closing of said scavenging port, said suction port and said exhaust port;

a scavenging passage cover constituting a portion of a wall of said scavenging passage; and a fuel injection nozzle, said fuel injection nozzle being mounted on said scavenging passage cover and being configured and disposed to inject fuel directly into said combustion chamber beginning at a time immediately before said scavenging port is to close.

2. The two-cycle internal combustion engine according to claim 1, wherein said fuel injection nozzle is mounted on and penetrates through said scavenging passage cover, a distal end portion of said fuel injection nozzle being directed to said combustion chamber so as to directly inject fuel into said combustion chamber.

3. The engine according to claim 1, wherein said scavenging passage cover is formed of heat-insulating material.

4. The engine according to claim 1, wherein said scavenging passage cover is formed of material having heat radiating properties.

* * * * *